Sept. 2, 1947.  F. J. LINGEL  2,426,777
ELECTRICAL MEASURING INSTRUMENT
Filed Aug. 1, 1945
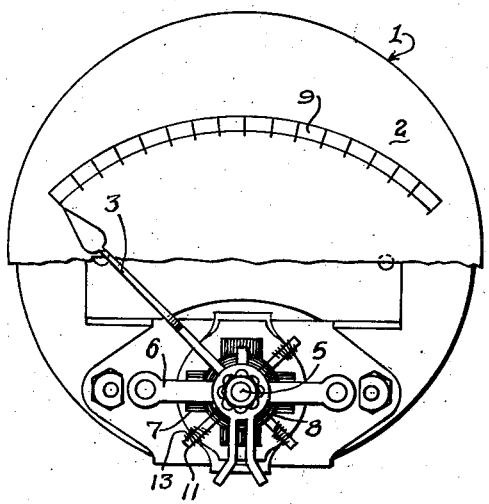
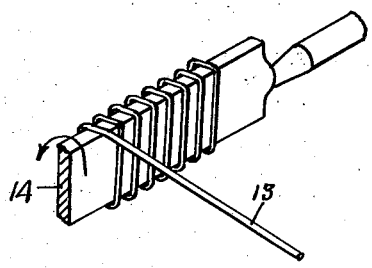
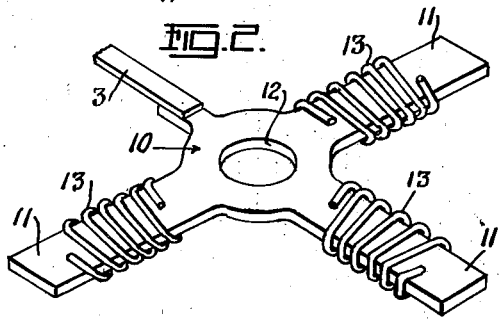
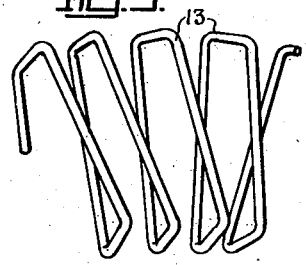
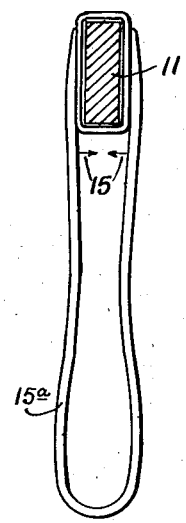
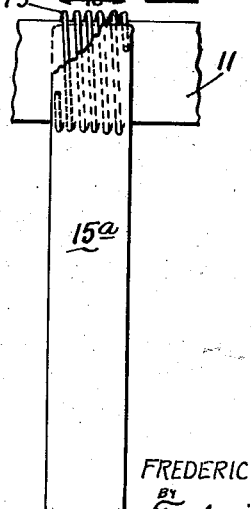
INVENTOR
FREDERICK J. LINGEL,
BY
Toulmin & Toulmin
ATTORNEYS Patented Sept. 2, 1947

2,426,777

UNITED STATES PATENT OFFICE 2,426,777

ELECTRICAL MEASURING INSTRUMENT

Frederick J. Lingel, Bluffton, Ohio, assignor to The Triplett Electrical Instrument Co., Bluffton, Ohio, a corporation of Ohio Application August 1, 1945, Serial No. 608,187

5 Claims. (Cl. 171—95)

The present invention relates to actuating elements of electrical measuring instruments and more particularly to the moving needle structure thereof.

Notwithstanding the fact that the needle is carried on a small shaft journaled in jewel bearings, position effects might be present if the needle is not finely balanced. For this purpose it has been the usual practice in the art to secure the needle to a so-called balance cross which rotates with the small instrument shaft and is connected to a magnetic actuating coil of the instrument. This balance cross is usually made of formed brass or heavy threaded aluminum and is provided with three arms, the needle or pointer constituting the fourth arm. In order to obtain a nicety of balance, small weights are secured to any one or all three of the arms, these weights being slidably mounted on its respective arm and adjusted while the instrument or its parts are undergoing tests. These weights are sometimes in the form of small sleeves which are crimped or otherwise secured in position after the proper balance has been obtained.

The work entailed in obtaining the proper balance of the cross is sometimes considerable, particularly when it involves loosening the sleeve in order to change the position on any one arm or all arms of the cross in order to counterbalance the weight and inertia of the moving pointer. It has been further found that on occasion when the instrument is returned from the field after considerable use, special balancing effects may be necessary to restore the instrument to its initial sensitivity. These effects are invariably obtained by moving the balance weights along the arms of the balance cross.

The primary object of the present invention is to provide an improved structure and technique for effecting the proper balance of the instrument pointer at the time of manufacture and initial assembly or when the instrument is returned for repairs or check-up.

Another object is to provide a tight balance weight which will be free to move during adjustment thus preventing damage to the pivots or jewels.

Another object is to provide an improved balance cross for measuring instruments and particularly improved weighing elements for the cross.

The invention will be better understood when reference is made to the following description and the accompanying drawings, in which:

Figure 1 represents the plan view of an electrical measuring instrument with the casing removed and parts broken away in order to show the interior structure.

Figure 2 is a perspective view of the improved balance cross.

Figure 3 illustrates the structure that may be employed in making the balance weights, while Figure 4 shows the balance weight material after it has been taken from the structure on which it is made.

Figure 5 is a perspective view of one of the improved weights.

Figure 6 is a diagrammatic view but showing the cross-arm in section and the end elevation of the tweezers being applied to the wire.

Figure 7 is a view of the same element shown in Figure 6 but with these elements moved through a 90° angle so that the flat face of the tweezers and of the cross-arm can be seen. A portion of one of the tweezers jaws had been broken away to expose the wire counter-weight.

Referring more particularly to Figure 1, reference character 1 generally designates the assembled parts of an electrical measuring instrument of the d'Arsonval type from which the casing and the window has been removed. The dial plate is indicated at 2 and the pointer or needle is illustrated at 3. This needle is carried on a shaft 5 which rests in a jewel bearing and the bearing is supported from the instrument by means of a bridge member 6. The shaft 5 carries a coil of fine wire which is adapted to rotate between the poled faces of a circular magnet indicated at 7. The current or voltage to be measured is fed to the coil through a spiral spring 8, one end of which is connected to the needle and its coil and the other end is connected to a stationary terminal. Two of these springs are provided in order to bring both sides of the line to the rotating coil. When the coil is energized, the magnetic field set up thereby reacts with the field of the magnet 7 in such a way as to cause the pointer 5 to assume an extended position along the scale 9. The pointer must therefore be very carefully balanced during this movement for otherwise the position that it assumes would not represent an accurate indication of the electrical impulse or impulses that had been applied to the actuating coil and in consequence, the indications would not be correct. Accordingly, elaborate precautions have to be taken to properly balance the pointer throughout its swinging movement and more especially to reduce any tendency of the indication to change with position of the instrument. In order to effect this balance, the prior art has proposed the use of metal loops which after they have been shifted along the arms of the balance cross to their respective proper positions they are soldered, crimped or otherwise held in position. However, in accordance with the present invention, I have devised an improved weight or rather an improved combination of a weight and a balance cross such that the weights can be readily adjusted at any predetermined time and there is no need for providing any special securing means between the weights and the arms of the cross because the weights automatically secure themselves to these arms.

Referring more particularly to Figure 2, reference character 10 generally designates the balance cross to which the pointer 3 is secured. The cross is provided with three arms 11 extending radially outwardly from the center of the cross, 90° from one another and from the pointer 3. An opening 12 is provided at the center of the cross to facilitate attachment with the shaft of the actuating element. Three weights 13 are shown in the form of small helices of wire which are surrounding their respective arms 11. These helices are wound on a rectangular mandrel 14 (Figure 3) having a width and depth approximately 10% greater than the width and depth of the cross arms 11. It is apparent as the mandrel 14 is rotated, as indicated by the arrow, and the fine spring wire 13, which may be spring brass, phosphor bronze or other non-magnetic material, is held tight, the wire is caused to bend at the corners of the mandrel and when the convolutions are moved from the mandrel the wire constitutes a long helix somewhat flattened in width. The next step is to snip or cut the formed wire into a predetermined length as is indicated by the dotted lines in Figure 4 to provide units of the necessary length. It will be noted that immediately upon snipping the spring wire, each length will undergo a distortion in the longitudinal direction so that one end of each length will move angularly with respect to the other end to produce a twisting action. This twisting appears to be caused by a release of the stress or strain in the wire which had been brought about by the bending action occasioned by the rotating mandrel 14. Whereas, if there were no twists in the individual lengths of wire the convolutions would accurately coincide with one another as seen from the end of the wire length, but on account of the twist there is a recession in the angular direction of the shape of the succeeding loops or convolutions so that the latter no longer coincide with one another. The only manner in which the loops can be brought into alignment as seen from the end of the coil is temporarily to eliminate the twist and this advantageous feature is employed in making adjustment of each wire or spring unit along the arm of the balance cross.

In practice, after the spring units have been snipped to the proper length as indicated in Figure 4 and have immediately taken on the angular twist referred to hereinbefore, a pair of tweezers, as indicated in Fig. 6, is clamped about the opposite flat sides of the unit and the flat jaws of the tweezers constrains the convolutions of the unit to a straightened or coincident shape. Under these conditions, it will be found that the unit can be readily slipped over the arm 11 and left in any desired position at which time the tweezers are removed. The element 13 then tries to assume its twisted shape in the longitudinal direction and in doing so, it is apparent that the convolutions tend to grip the arm 11 quite firmly.

In order to shift the position of the element 13, it is necessary merely to pinch the flat sides of the spiral member 13 by applying a pair of tweezers and it will be found that the series of loops can readily be slid over the arm 11 to a new position because while being held by the tweezers the loops have an interior size approximately that of the mandrel 14 which is somewhat greater than the size of the arm 11. Thus, in adjusting the spiral weights or spring 13, it is necessary only to apply a pair of tweezers which not only serve to carry the weight to the arm 11 but also serves to manipulate the clamping effect obtained through this peculiar twist imparted to the convolutions while being wound on the mandrel.

While I do not wish to be limited in theory as to why the convolutions 13 take on the slight spiral shape when the unit lengths are snipped from the remaining mandrel lengths or when the clamping effect of the tweezers is removed, it is possible that this spiral tendency is brought about by the coil or spring tending to unwind itself of its own accord. Regardless of the true explanation of this tendency to spiral or twist, the fact remains that in practice the convolutions do take on a twisted shape which I have successfully used in obtaining a clamping effect between each helix weight 13 and the balance arm 11. The presence of this twist has been illustrated in Fig. 5 which is a perspective view of the improved weight element.

In Figures 6 and 7, I have indicated the manner in which the tweezers 15a can be applied to the sides of the loops or convolutions and it will be noted that as the legs of the tweezers are compressed, as indicated by the arrows 15, the convolutions all align themselves to permit the arm 11 to be loosely received thereby. Thus, the unit 13 can be moved in either direction along the arm as indicated by the arrow 16 in Fig. 7.

The balance arms should preferably be made out of rough stampings in which the burred edge of the metal serves to provide an additional surface for the spring convolutions. The latter may be wound close together or with a small space between turns because in either case the convolutions will assume the longitudinal twist regardless of the spacing between turns.

Among the advantages of the improved counterweight structure is that the counterweight is more easily handled because of its flattened sides. If these weights were circular they would tend to roll off the workman's bench and some, of course, may be lost. Another advantage is that due to the flattened configuration, smaller space and depth is taken by the balance arm structure as a whole so that greater clearance can be given to other parts of the moving element for a given weight balance. Moreover, the only apparatus necessary in applying the flattened helical weights is a simple pair of tweezers and no special tools or wrenches are necessary or required for making the adjustments as all of these are effected solely by the use of the tweezers. Greater clamping effects are also obtainable when the weight helices are released by the tweezers on account of the extra tension of the spring material as compared with flat unspringy strip or loop materials which have heretofore been used for counterweights. There is also the simplicity of manufacture of these counterweights, as it is necessary merely to wind the convolutions on a flat mandrel and then cut off to the required length—the twist is inherent in the winding. Finally, the fact that there is ample clearance between each cross arm and the convoluted member 13 when pressure is applied to the sides thereof permits the use of punched flat hard brass or similar material for the balance cross 11 because the dimensions are no longer highly critical. In the case of flat strip loops which have been used heretofore the interior dimension of these loops are only slightly greater than that of the dimensions of the cross arm 11 in order to provide a tight sliding fit so that the balance arm 11 under these circumstances must be provided with close tolerances. But in view of the much greater clearance between my improved counterweight and the balance arm 11, the dimensions of the latter need not be critical whatsoever and consequently, these arms can be formed of hard brass which has been merely punched to shape. This provision obviously represents a considerable saving in cost of manufacture. Incidently, the burred edges left on the arms as the result of the punching process are beneficial in increasing the clamping effect of the convolutions 13 when the tweezer pressure has been removed.

While I have described my improved needle structure mainly from the standpoint of an electrical measuring instrument, it will be understood that the torsional type of counterweight can be applied directly to the pointers or to the balance cross of any kind of indicating or recording instrument which employs a movable element.

It will be understood that I desire to comprehend within my invention such modifications as come within the scope of the claims and the invention.

Having thus fully described my invention, what I claim as new and desire to secure by Letters Patent, is:

1. As an article of manufacture, a balance cross for an indicating device, said cross comprising a plurality of rectangular arms extending angularly with respect to one another, and a counterweight on at least one of said arms, said counterweight comprising a rectangular wire helix having a normal untwisted shape from true rectangular form to cause the helix to grip the arm on which it is supported.

2. As an article of manufacture, a balance cross for an indicating device, and a counterweight surrounding at least one rectangular arm of said cross, said counterweight comprising rectangular helical convolutions of wire which tend to untwist from true rectangular form to cause them to clamp themselves to the arm of the cross solely by a twisting action imparted to the wire.

3. A counterweight for use on a balance cross in connection with electrical measuring instruments, said counterweight comprising a rectangular wire helix having a normal untwisted position such that the convolutions are out of sidewise parallel alignment with one another.

4. A balance cross for an electrical measuring instrument, said cross comprising a plurality of radially disposed rectangular arms extending angularly with respect to one another and a counterweight on at least one of said arms, said counterweight being detachably affixed for adjustment on said arm by application of pressure solely to said counterweight.

5. A balance cross for an electrical measuring instrument, said cross comprising a plurality of rectangular arms extending angularly with respect to one another and a counterweight on at least one of said arms, said counterweight comprising a plurality of rectangular wire convolutions which are secured to the arm by an untwisting effect contained solely within the convolutions.

FREDERICK J. LINGEL.

REFERENCES CITED

The following references are of record in the file of this patent:

UNITED STATES PATENTS

| Number | Name | Date |
| --- | --- | --- |
| 2,346,572 | Goodwink, Jr. | Apr. 11, 1944 |
| 2,245,781 | Hickok | June 17, 1941 |
| 1,824,561 | Miller | Sept. 22, 1931 |
| 2,111,001 | Norman | Mar. 15, 1938 |